March 17, 1931.  B. MOORE ET AL  1,796,471
TOP FOR RUMBLE SEATS OF AUTOMOBILES
Filed Jan. 17, 1929   2 Sheets-Sheet 1

Inventors.
Benjamin Moore
Edward H. Benn
by Heard Smith & Tennant.
Attys.

March 17, 1931.   B. MOORE ET AL   1,796,471
TOP FOR RUMBLE SEATS OF AUTOMOBILES
Filed Jan. 17, 1929   2 Sheets-Sheet 2
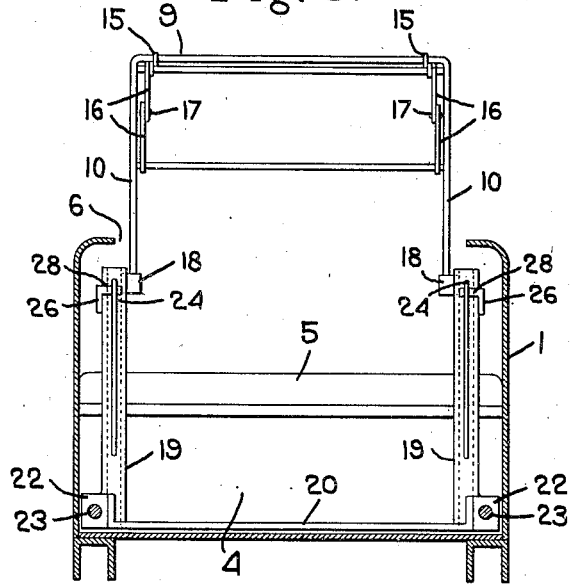
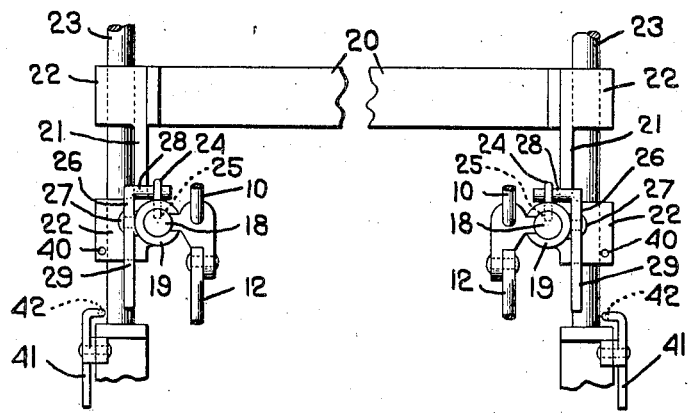
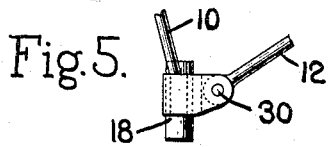
Inventors.
Benjamin Moore
Edward H. Benn
by Heard Smith & Tennant
Attys.

Patented Mar. 17, 1931

1,796,471

UNITED STATES PATENT OFFICE

BENJAMIN MOORE AND EDWARD H. BENN, OF BOSTON, MASSACHUSETTS, ASSIGNORS TO RUMBLETOP CORPORATION, OF BOSTON, MASSACHUSETTS, A CORPORATION OF MASSACHUSETTS

TOP FOR RUMBLE SEATS OF AUTOMOBILES

Application filed January 17, 1929. Serial No. 333,122.

This invention relates to automobiles of the roadster, coupe or like body type which is equipped with a so-called "rumble" seat located within a compartment below the rear deck of the automobile, and a principal object of the invention is to provide a novel top for sheltering the rumble seat which comprises a main bow and a collapsible top associated with the bow and adapted to be folded thereagainst when the bow is in its operative raised position thereby to give access to the rumble seat, said bow and top being so constructed that when the top is folded against the bow, said bow and folded top can be bodily carried downwardly through the opening through which the rumble seat is accessible and forwardly to a position in which the bow has disappeared into said compartment and is entirely out of the way of the occupants of the rumble seat.

A further object of the invention is to provide a novel top for the rumble seat comprising a bow with a folding top collapsible against the bow and which is so constructed that the top can be folded against the bow and the folded top and bow can be lowered into and stored in the compartment while the rumble seat is occupied and without disturbing the occupants thereof.

Other features and advantages of the invention will be more fully hereinafter set forth.

In order to give an understanding of the invention we have illustrated in the drawings a selected embodiment thereof which will now be described after which the novel features will be pointed out in the appended claims.

Fig. 3 is a section on the line 3—3, Fig. 2;

Fig. 4 is a fragmentary view illustrating one way of mounting the folding top to permit it to be stored in the rear compartment of the automobile;
Fig. 5 is a fragmentary view of one of the runners of the folding top;

Figure 1:
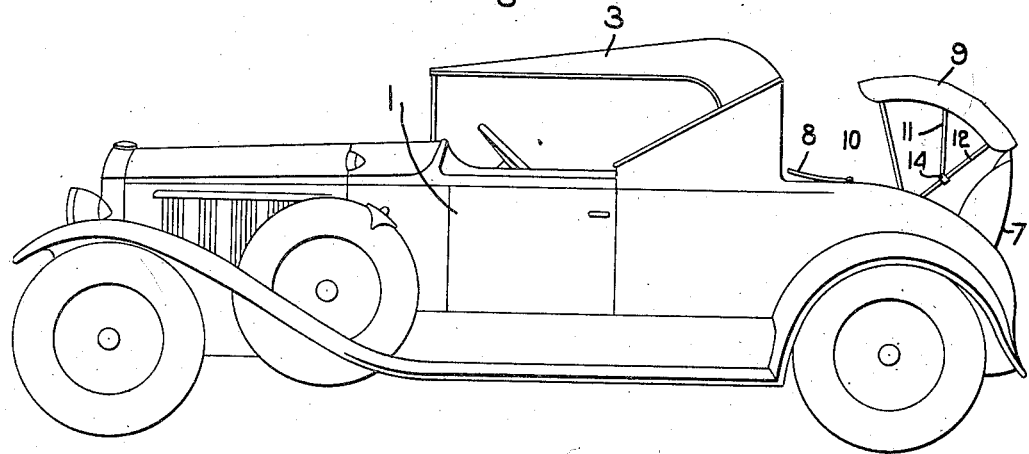
Fig. 1 is a side view of an automobile of the roadster type which is equipped with a rumble seat and which is also provided with our improved top for the rumble seat.
Figure 2:
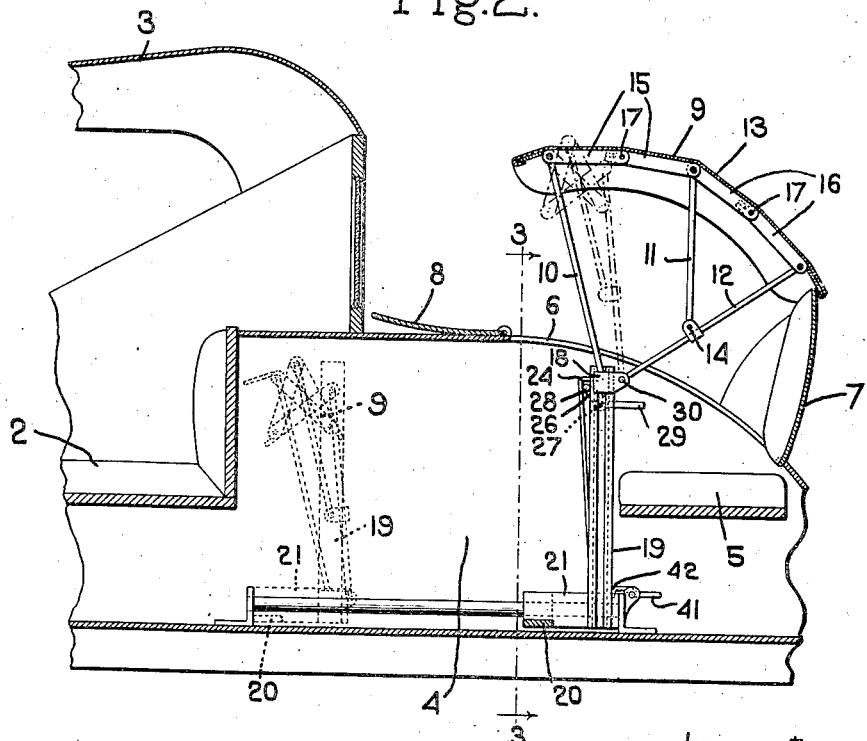
Fig. 2 is an enlarged sectional view showing the manner in which the top can be folded and stored within a compartment of the car.

In the drawings 1 indicates an automobile of the roadster type which is provided with the usual front driver's seat 2 and with the top 3 therefor. The automobile body is also made with the usual rear deck in the rear of the driver's seat beneath which is the usual deck pit or rear compartment 4. Situated in the deck pit or rear compartment 4 is the rumble seat 5, said seat being located below the rear deck as usual. The rear deck is provided with the mouth or opening 6 through which the rumble seat is accessible. This opening is arranged to be closed by some suitable closure when the rumble seat is not in use. The character of the closure varies with automobiles of different makes. In some automobiles this closure is a single member and in others it is formed in two or more sections, which are sometimes pivoted together and are sometimes separate and arranged so that one will open toward the front and the other open toward the back and constitute the back of the rumble seat. In the drawings we have shown the latter construction and the two sections of the closure for the opening 6 are shown at 7 and 8, the section 7 opening toward the back and when open forming the back of the rumble seat while the section 8 opens forwardly as shown in Fig. 2.

As stated above this invention concerns particularly a novel top to shelter the rumble seat and the top herein shown comprises a main bow 10 and a collapsible top or canopy member 9 which is foldable or collapsible against the bow 10. The bow 10 is located at the front portion of the top and the top member 9 is extensible rearwardly from the bow and is foldable forwardly against the bow. Means are provided for supporting the bow in raised operative position as shown in full lines in Fig. 2 and when the bow is in this position and the top is extended as shown in full lines it forms a shelter for the rumble seat.

The top can be folded forwardly against the bow while it is still raised thus providing access to the rumble seat so that passengers can easily climb into or out of said seat. Furthermore, when the top is thus collapsed against the raised bow then the bow and the collapsed top can be moved bodily through the opening 6 and forwardly into the compartment 4 for stowage beneath the deck and this collapsing of the top and moving it into the compartment 4 can be accomplished by persons sitting in the rumble seat.

In the particular construction shown the top is made with the auxiliary bow 12 connected to the rear of the top and pivotally mounted to fold against the main bow 10 and the top also includes an intermediate bow 11 pivoted to the bow 12 at 14, the top material being secured to the bows in any suitable way.

In the construction herein shown the top is held in its expanded or open condition by some suitable means, such as toggle lever brace elements 15, 16 which may conveniently be located on the sides of the top and which are connected to the bows. The brace elements 15 connect the bows 10 and 11 while the brace elements 16 connect the bows 11 and 12. When these toggle lever brace elements are straightened the bows will be held in their open position and the top will be extended, but by breaking the toggle lever, which may be done by swinging the centre pivots 17 thereof downwardly, the top may be collapsed by folding the rear bow 12 against the main front bow 10. The top is thus a forwardly folding top and when it is folded it is situated in front of the rumble seat and thus does not interfere with passengers getting into or alighting from said seat.

As stated above the invention contemplates a construction whereby after the top has been folded or collapsed against the bow 10 said bow and collapsed top can be moved bodily downwardly through the opening 6 into the storage compartment 4 and forwardly into a storage position underneath the rear deck. This is provided for by the use of carrier means on which the bow 10 is mounted and suitable guide members for the carrier means which are located within the compartment 4 and which serve to guide the bow with the folded top through the opening 6 and into the compartment.

In the construction shown the bow 10 is rigidly mounted on runners 18 which are adapted to slide vertically on upstanding guiding members 19 rising from a carriage 20 which in turn is arranged to be moved backwardly and forwardly in the compartment 4. For this purpose the carriage is mounted on two guiding rods 23 which are secured to the floor of the compartment and the carriage is formed at each end with hubs or bosses 22 through which the guide rods 23 extend and with rearwardly-extending arms 21 to which the vertical guides 19 are secured.

Means are provided for holding the runners 18 in their raised position shown in full lines Fig. 2 at such time as the top is to be used, and while any suitable means may be employed for this purpose we have herein shown each runner 18 as provided with a spring-pressed locking latch 24 which extends through an opening in the guide 19 and is adapted to enter a recess 25 in the runner 18 thereby to lock the runner in its raised position. The spring-pressed latches are shown as being manipulated by lever arms 26 pivoted at 27 to the vertical guides 19 and each having at its end a lateral finger 28 adapted to engage the latch 24.

The end 29 of each lever arm extends rearwardly from the vertical guide 19 so that when the ends 29 are raised the portions 28 will engage the spring-pressed latches and thus withdraw them from locking engagement with the runners. When this is done the runners are free to slide downwardly in the guides 19. The front bow 10 is an inherently rigid bow with legs of fixed length. Said bow 10 may be regarded as a rigid top-supporting element 6 which constitutes a support for the folding top.

The front bow 10 is rigid with the runners 18 and hence can have no fore and aft swinging movement. Since the rear bow 12 is pivoted to the runners as shown at 30 said rear bow can be folded up forwardly toward the front bow 10 so that in its folded condition the top will have the dot and dash line position shown in Fig. 2. The front bow 10 is located in front of the back of the rumble seat and when the top structure is folded by folding the rear bow 12 forwardly against the front bow 10, as shown by said dot and dash line position in Fig. 2, the folded top structure will be situated in front of the rumble seat sufficiently so that persons can get into or out of the seat from behind the folded top.

Some suitable means will preferably be used to lock the carriage 20 in its rearward position, and merely as illustrating one device suitable for this purpose we have shown pivoted locking levers 41 each having a nose 42 adapted to lock into an opening 40 in one of the bosses 22. When the carriage is in its rearward position as shown in full lines Fig. 2 the noses of the locking levers 41 can be entered into the recesses 40 and thus lock the carriage from movement. The carriage can be easily unlocked by simply depressing the free ends of the levers by raising the noses from said recesses. Any other appropriate lock may be used however without departing from the invention.

Assuming that the top is opened as shown in full lines Fig. 2 and that the rumble seat is occupied by persons who wish to alight from the automobile, the occupants of the seat can readily reach the toggle lever braces 15 and 16 and pull the center pivots 17 thereof downwardly thus breaking the toggles and permitting the top member to be folded or collapsed forwardly into the dot and dash line position while the passengers are still in the rumble seat. When in this position there is plenty of room for the occupants of the rumble seat to alight therefrom.

If the occupants of the rumble seat do not wish the protection of the top, then the top member may be folded against the front bow as above described and as shown in the dotted and dash lines Fig. 2 and thereafter the bow 10 with the folded top can be moved by the occupants of the rumble seat, and while they are still occupying the seat, downwardly through the opening 6 into the compartment 4 and forwardly into stowage space beneath the rear deck of the automobile.

This is accomplished by releasing the latches 24 by means of the lever arms 26 thereby unlocking the runners and allowing them with the bow 10 and folded top to move downwardly into the compartment 4. The carriage may then be unlocked and moved forwardly into the dotted line position Fig. 2.

A feature of the invention which we regard as important is that the top for the rumble seat is so constructed that it can be collapsed or folded forwardly against the main bow in order to give access to the rumble seat, while the top is still raised and independent of any movement by which the top is carried into storage space, and further that after the top has thus been folded while in its raised position said bow with the folded top can be moved bodily downwardly through the opening 6 and forwardly into stowage position lying wholly in front of the rumble seat. Moreover, this operation of folding the top and then lowering it into stowage space can be performed by the occupants of the rumble seat and while they are still occupying the seat. In thus lowering the folded top and bow 10 into the stowage position the top will pass through the opening 6 between the front edge thereof and the legs of the occupants of the rumble seat. Similarly, the top can be withdrawn from stowage position shown in dotted lines Fig. 2, and can be erected by the occupants of the rumble seat and while they are so occupying it.

Another feature of the invention is that the folded top is maintained in a general upright position while it is being stored in the compartment or removed therefrom, in other words, while it is being moved from its raised folded position shown in dot and dash lines Fig. 2 to its stored position within the compartment 4. Because of the fact that the folded top is in a general upright position when it is stored the bridge portion of the bows and the folded top material will be located directly underneath the deck and thus will not intrude upon the foot room of the persons occupying the rumble seat. The folded top is thus stored in such a way that it does not inconvenience or interfere with the occupants of the rumble seat.

While we have illustrated herein a selected embodiment of the invention for the purpose of disclosing the principles thereof yet we do not wish to be limited to the constructional features shown as these may be varied in various ways without departing from the invention.

I claim:

1. In an automobile having a body provided with a front seat and main top therefor, said body having a rear compartment equipped with a rumble seat and provided with a storage space disposed in front of said rumble seat, there being an opening in the rear deck of the automobile body through which said rumble seat is accessible, an inherently rigid top-supportnig element which when raised is situated in front of the back of said rumble seat and is movable from raised position above said seat into said storage space through said opening while in a general upright position, means to guide said top-supporting element in its movement, and a collapsible top carried by said top-supporting element, said top being extensible rearwardly from said element to shelter the rumble seat and being collapsible forwardly against said element to give access to said seat when the top-supporting element is in raised position and independently of any movement of said element, said top when collapsed being movable bodily with the top-supporting element into and out of the storage space of said compartment through said opening.

2. A vehicle having a front passenger compartment and a deck-pit located rearwardly thereof, a rumble seat mounted within said pit in spaced relationship from said passenger compartment and arranged to provide for a deck-overhung storage space between said seat and passenger compartment, which space also affords foot room for the rumble seat occupants, a unitary collapsible top structure comprising a rigid main bow movable while in a general upright position from raised position above said rumble seat and in front of the back thereof downwardly through said opening and forwardly from the front edge of said rumble seat into said storage space without interfering with the seated occupants of the rumble seat, a supplementary bow pivotally connected to the main bow and top material secured to said bows, means for guiding the main bow from its raised position into its storage position in said storage space, said supplementary bow being extensible from the main bow to provide shelter for the rumble seat and being foldable forwardly against the main bow when the latter is in raised position and independently of any movement thereof to provide access to said rumble seat.

3. A vehicle having a front passenger compartment, a rear deck, and a rear compartment beneath said deck, a rumble seat mounted within said rear compartment in spaced relationship from said front passenger compartment, said deck having an opening to provide access to the rumble seat and the rear compartment providing a deck-overhung storage space in front of the rumble seat and also providing foot room for the rumble seat occupant, a unitary collapsible top structure of the disappearing type comprising a main bow having its bridge member disposed transversely with legs depending from the respective ends thereof, said top structure further comprising a supplementary bow which in erected position is adapted to extend a canopy cover over said seat and which bow is foldable against the raised main bow to facilitate access to the seat, and carrier means including cooperating runways serving to guide the folded top structure bodily and while in a generally upright position downward through said opening, thence forwardly over the legs of the seated occupant and into said storage, the bridge of said main bow being thereby lodged underneath said overhung deck region with the respective depending legs directed downwardly without encroaching upon the foot room required by the seat occupant.

4. A vehicle having a front passenger compartment and a deck-pit located rearwardly thereof, a rumble seat mounted within said pit in spaced relationship from said passenger compartment and arranged to provide for a deck-overhung storage space between said seat and passenger compartment, which space also affords foot room for the rumble seat occupants, a unitary collapsible top structure comprising a main bow having a bridge portion and depending leg portions, said bow being movable while in general upright position from raised position above said rumble seat and in front of the back thereof downwardly through said opening and forwardly from the front edge of said rumble seat into said storage space into a position in which the bridge of said lowered main bow is located directly beneath the overhung deck with the legs of the bow directed downwardly without interfering with the seated occupant of the rumble seat and which structure further comprises a supplementary bow pivotally connected to the main bow with top material secured between said bows, said supplementary bow being foldable against the raised bow independently of any movement of the latter to provide access to the rumble seat, and means for guiding the folded top structure bodily downwardly and forwardly into said storage space.

In testimony whereof, we have signed our names to this specification.

BENJAMIN MOORE.
EDWARD H. BENN.